(12) United States Patent
Kao et al.

(10) Patent No.: US 8,805,862 B2
(45) Date of Patent: Aug. 12, 2014

(54) VIDEO SEARCH METHOD USING MOTION VECTORS AND APPARATUS THEREOF

(75) Inventors: Jung-Yang Kao, Pingtung County (TW); Jih-Sheng Tu, Yilan County (TW)

(73) Assignee: Industrial Technology Research Institute, Hsinchu (TW)

( * ) Notice: Subject to any disclaimer, the term of this patent is extended or adjusted under 35 U.S.C. 154(b) by 201 days.

(21) Appl. No.: 12/804,477

(22) Filed: Jul. 21, 2010

(65) Prior Publication Data
US 2011/0145265 A1 Jun. 16, 2011

Related U.S. Application Data

(60) Provisional application No. 61/234,636, filed on Aug. 18, 2009.

(30) Foreign Application Priority Data

Apr. 30, 2010 (TW) .............................. 99113963 A

(51) Int. Cl.
G06F 17/30 (2006.01)
G06K 9/00 (2006.01)

(52) U.S. Cl.
CPC ...... *G06F 17/30781* (2013.01); *G06K 9/00711* (2013.01)
USPC ............ 707/756; 718/104; 711/170; 707/769

(58) Field of Classification Search
CPC ................. H04N 19/00781; H04N 19/00278; H04N 19/00145; H04N 19/006; H04N 19/00818; H04N 19/0003; H04N 19/0009; H04N 19/0026; H04N 19/00369; H04N 19/00472; H04N 19/00545; H04N 19/0083; H04N 19/00836

USPC ........................................... 707/756
See application file for complete search history.

(56) References Cited

U.S. PATENT DOCUMENTS

| | | | |
|---|---|---|---|
| 5,796,434 A * | 8/1998 | Lempel ...................... | 348/403.1 |
| 7,710,498 B2 * | 5/2010 | Kondo et al. ................. | 348/441 |
| 2003/0033347 A1 | 2/2003 | Bolle et al. | |
| 2004/0221143 A1* | 11/2004 | Wise et al. .................... | 712/300 |

(Continued)

FOREIGN PATENT DOCUMENTS

| | | |
|---|---|---|
| CN | 1412719 | 4/2003 |
| TW | 200731798 | 8/2007 |
| TW | 200917852 | 4/2009 |

OTHER PUBLICATIONS

Office Action of Taiwan Counterpart Application, issued on Sep. 17, 2013, p. 1-p. 8, in which the listed references were cited.

(Continued)

*Primary Examiner* — Shyue Jiunn Hwa
(74) *Attorney, Agent, or Firm* — J.C. Patents

(57) ABSTRACT

A video search method and an apparatus thereof are provided. In the video search method, the bit streams of a query video file and a plurality of video files to be searched are parsed to obtain a plurality of corresponding motion vectors (MVs). A plurality of corresponding MV maps is constructed in a time domain according to the MVs. Correlations are obtained according to the MV map corresponding to the query video file and the MV maps corresponding to the video files, and a video search result is obtained according to the correlations.

29 Claims, 17 Drawing Sheets

(56) References Cited

U.S. PATENT DOCUMENTS

| | | |
|---|---|---|
| 2006/0028400 A1* | 2/2006 | Lapstun et al. .................... 345/8 |
| 2007/0002946 A1 | 1/2007 | Bouton et al. |
| 2007/0033170 A1 | 2/2007 | Sull et al. |
| 2008/0231745 A1* | 9/2008 | Ogino et al. .................. 348/441 |
| 2008/0235283 A1 | 9/2008 | Turnball et al. |
| 2008/0262996 A1 | 10/2008 | Yogeshwar et al. |
| 2009/0086034 A1 | 4/2009 | Nakamura et al. |
| 2009/0208106 A1 | 8/2009 | Dunlop et al. |

OTHER PUBLICATIONS

Non-final Office Action of US Continuation Application, issued on Jan. 11, 2013, p. 1-p. 20, in which the listed references were cited.
Third Office Action of China Counterpart Application, issued on Mar. 12, 2013, p. 1-p. 13, in which the listed references were cited.

* cited by examiner

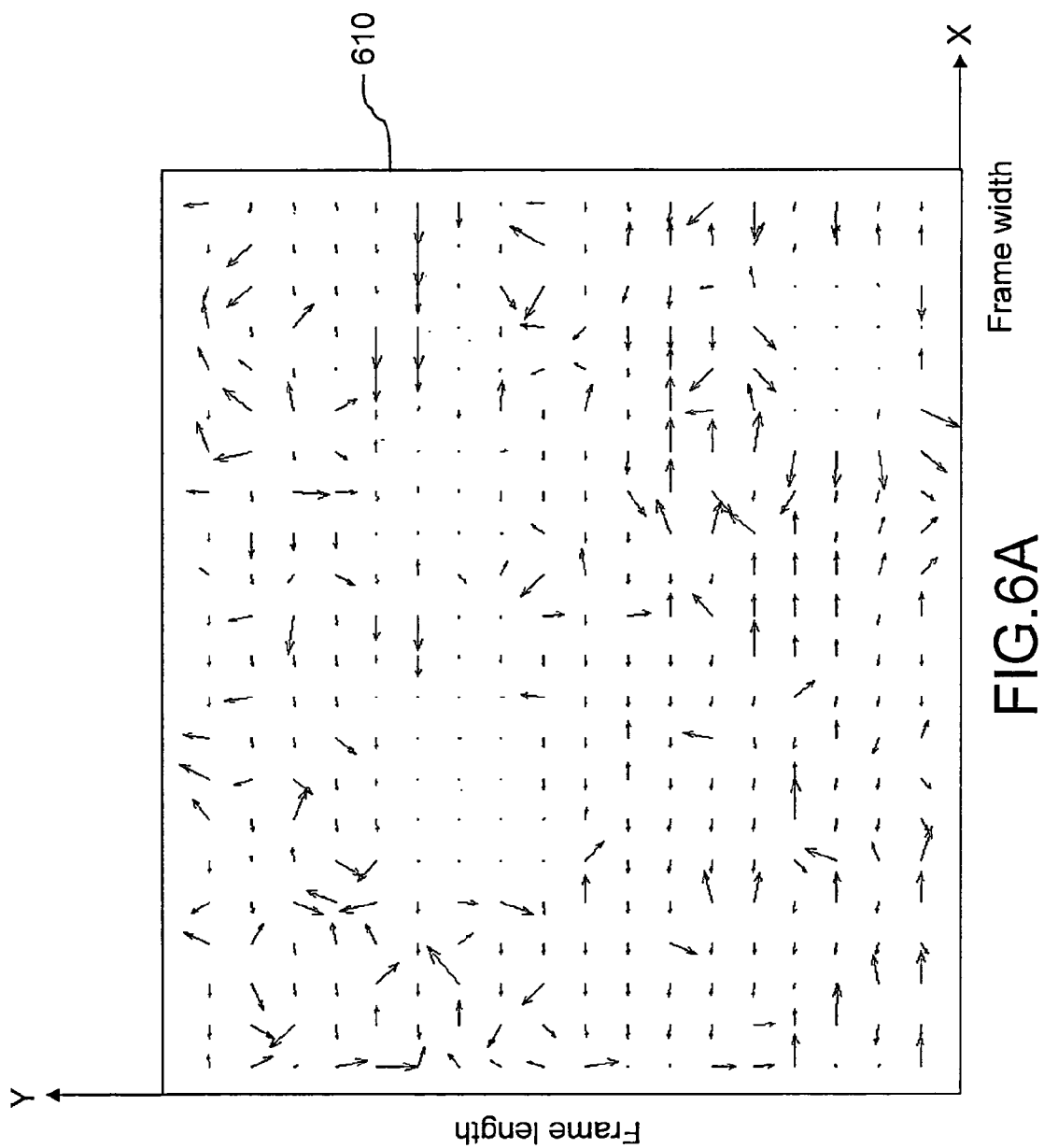

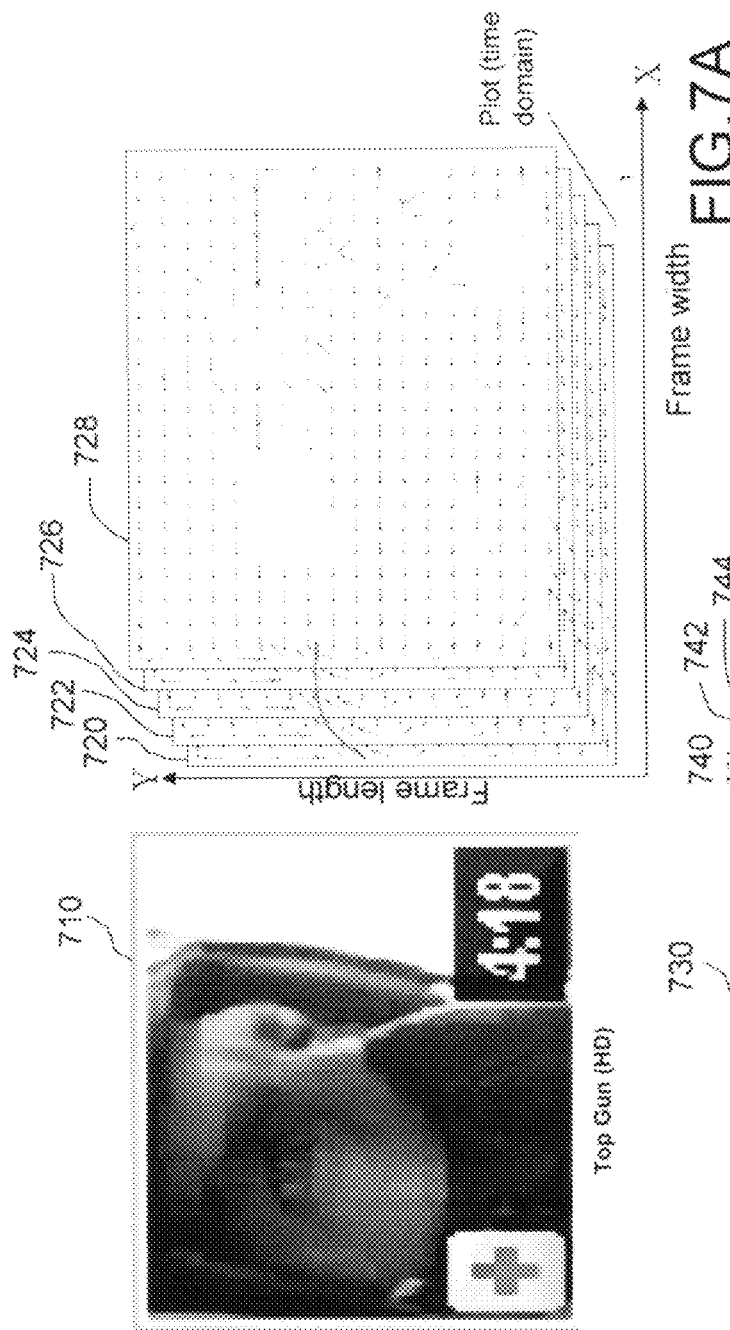
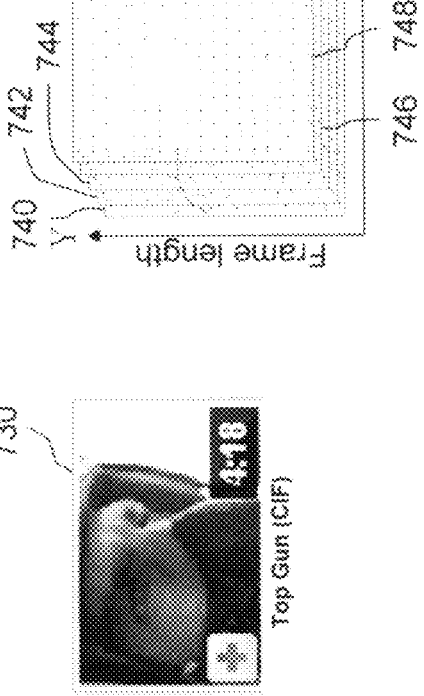
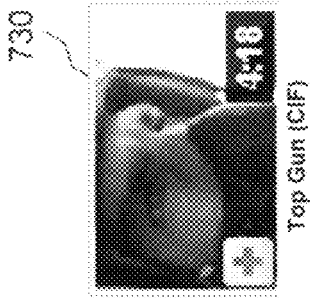
FIG. 7A
FIG. 7B

VIDEO SEARCH METHOD USING MOTION VECTORS AND APPARATUS THEREOF

CROSS-REFERENCE TO RELATED APPLICATION

This application claims the priority benefit of U.S. provisional application Ser. No. 61/234,636, filed on Aug. 18, 2009. This application also claims the priority benefits of Taiwan application serial no. 99113963, filed on Apr. 30, 2010. The entirety of each of the above-mentioned patent applications is hereby incorporated by reference herein and made a part of this specification.

BACKGROUND OF THE INVENTION

1. Technical Field

The disclosure relates to a video search method and an apparatus thereof, and more particularly, to a video search method in which a video content is served as a search condition and an apparatus thereof.

2. Background

All search engines currently used on the Web, such as Google, Yahoo, Youtube, and many other domestic search engines, are text-based. Even though each of aforementioned search engines is dedicated to break the limit of text-based search, for example, by hunting contents containing the keyword in both traditional Chinese and simplified Chinese (or even in other languages), the search result is still limited by the keyword. For example, when related multimedia data (audio or video files) is to be searched, it may not be possible to find the correct data or enough related data by using the keyword because of insufficient text content in the keyword or different translations of the keyword adopted by different countries.

The search engine Google started to offer an image search service since April, 2009, and this is the first service in the world which allows a user to search for related data according to an image content. For example, referring to FIG. 1A, when a keyword 110 ("apple") is input in the input field 120, data related to "apple" is displayed. Herein the related data includes all images containing an apple-shaped object and the cell phone ("iPhone") with the trademark "Apple". Unwanted data can then be eliminated by performing further selections. For example, as shown in FIG. 1B, after a user selects an image containing an apple-shaped object, the search engine further displays images related to this fruit (apple). Or, as shown in FIG. 1C, after the user selects the image of "iPhone" with the trademark "Apple®", the search engine displays other images related to this product so as to allow the user to find the desired image. However, this technique is to look for images based on an image content, and which is limited to the search of related image files and does not work on multimedia files.

In order to resolve aforementioned problem, the Motion Picture Expert Group (MPEG) has developed the MPEG-7 standard which describes complementary data of a content, in particular, a digital multimedia content. According to this MPEP-7 standard, a corresponding multimedia content description independent of other MPEG standards can be provided to a multimedia content, and the digital content description may even be attached to an analog movie file. As shown in FIG. 2, a corresponding content description is provided to each audio-visual (AV) content (as the AV content in FIG. 2), wherein the content description describes related characteristic values of the AV content, and which is arranged in the file as:

AV+Descript+AV+Desript+AV+Desript+ . . . .

Herein "AV" represents the AV content, and "Descript" represents the corresponding content description.

However, such a structure is very complicated and requires all multimedia files to be re-arranged therefore is not suitable to existing files and structures. Besides, even though related multimedia files can be located through keyword search by using the characteristic values, the technique is still limited by the text-based search with respect to different languages.

Additionally, inputting keywords on TV to search videos is unavoidable with the ongoing trend in the integration of TV and the web. Since a remote control is usually the only tool used for watching TV and it is impossible to realize a text input function on the remote control due to the limited size and function thereof, how to accomplish a video search function on an Internet TV by using a remote control is one of the major subjects in the development of Internet TVs.

SUMMARY

A video search method and an apparatus thereof are introduced herein.

According to an exemplary embodiment, a video search method is provided. In the video search method, the bit streams of an input query video file and a plurality of video files to be searched are parsed to obtain a plurality of corresponding motion vectors (MVs). A plurality of corresponding MV maps is constructed in a time domain according to the MVs. Correlations are obtained according to the MV map corresponding to the query video file and the MV maps corresponding to the video files, and a video search result is obtained according to the correlations.

According to an exemplary embodiment, a video search apparatus including a stream parser, a 3-dimensional (3D) MV map generator, and a 3D MV map comparator is provided. The stream parser parses the bit stream of a video file and obtains MVs from the bit stream according to different proportions. The 3D MV map generator constructs a 3D MV map in a time domain according to the MVs. The 3D MV map comparator calculates a correlation of the video file according to the 3D MV map, so as to obtain a video search result according to the correlation.

According to an exemplary embodiment, a video playing apparatus having a host and a controller is provided. The host has a video search apparatus. The video search apparatus includes a stream parser, a 3D MV map generator, and a 3D MV map comparator. The controller has a function control apparatus. The function control apparatus allows a user to select one section of a video data played by the host as a query video file of the video search apparatus.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 6A is a diagram illustrating motion vectors (MVs) in a frame.

FIG. 7A and FIG. 7B are diagrams respectively illustrating movie sections belonging to the same movie but having different resolutions and continuous frames thereof.

DETAILED DESCRIPTION OF DISCLOSED EMBODIMENTS

Figure 1A:
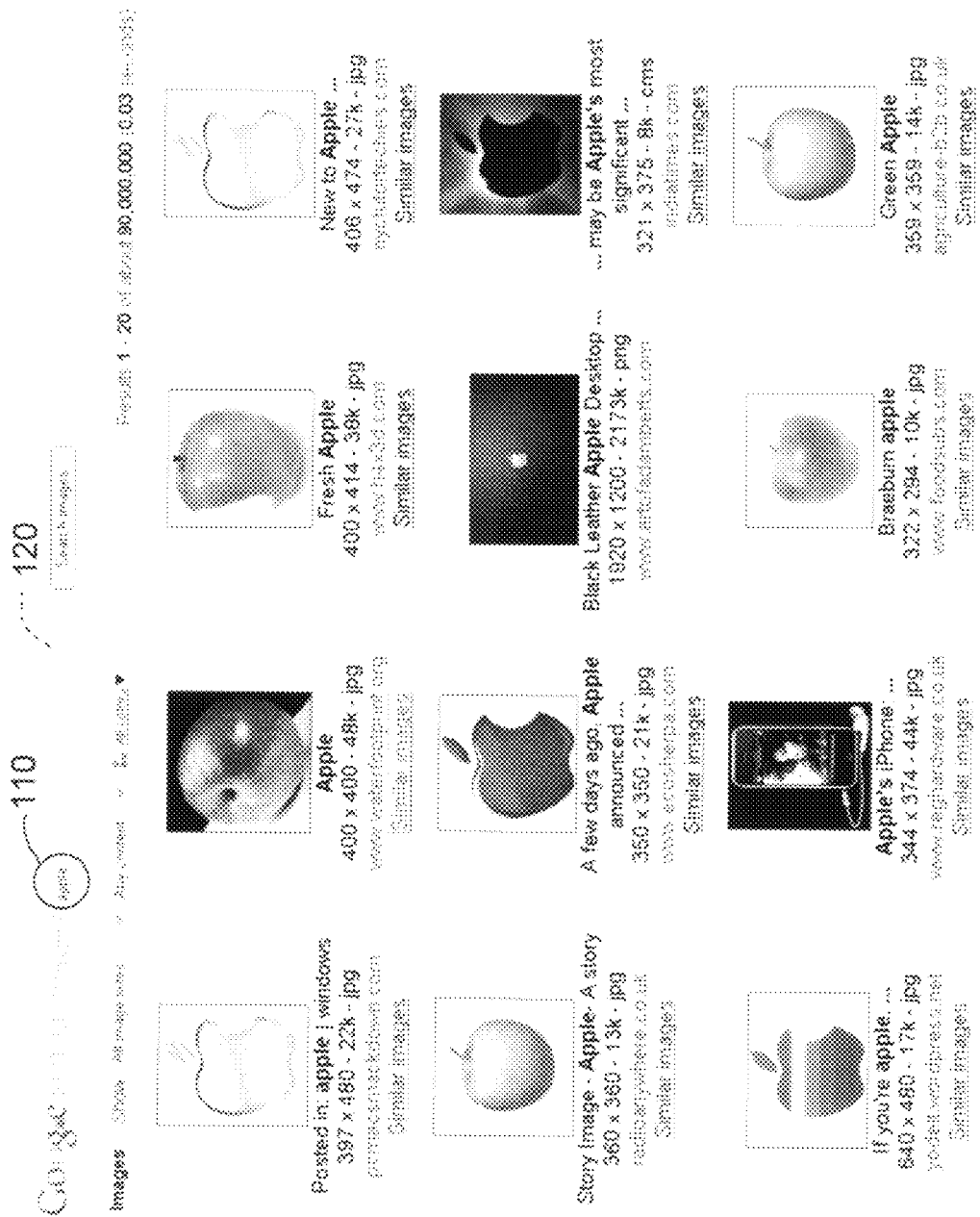
FIGS. 1A-1C are diagrams illustrating a conventional title-based image search method.

Exemplary embodiments of the disclosure provide a new video search technique, in which a video content is served as a search condition so that related video results can be found according to the video content.

In an exemplary embodiment of the disclosure, a video file is selected as a query message. In the embodiment, a video file having a time length may be selected by a user as the query message, or a video file within a fixed time duration or within a specific time duration may be automatically selected through a user interface and served as the query message.

In an embodiment, aforementioned method for selecting the query message can be built in a remote control for controlling the playing of a movie, such as a television set or a DVD player. The method may also be built in a user interface on a touch display or a display screen such that the user can conveniently capture a section of the movie as a query message.

The video files selected as search conditions may have different titles, formats, sizes, or even qualities. However, if these video files are captured from the same movie, they have the same plot, and the motion vectors (MVs) thereof have the same or similar distributions (as shown in FIG. 7A or FIG. 7B, will be described later). Thus, movies having the same or similar plots can be found by simply establish search indexes with respect to the selected video files. For example, a video file selected as the search condition and all other video files to be searched are first converted into video files having the same format. Because the concept of time domain is introduced in the embodiment, video files corresponding to the same section in the time domain can be located in all other video files to be searched. After that, these video files are converted into video files having the same format. In an embodiment, all other video files to be searched are stored in an Intranet host, a host database of a search engine, or a cloud database. The format conversion operation may be carried out on a personal host, an Intranet system server, a host of a search engine, or a cloud operating system.

In the exemplary embodiment, in a method of converting the video files into the same format, the video file used as the search condition and the MVs of all other video file to be queried are obtained. Namely, the MVs are obtained from a plurality of frames in each compressed video file, and the search indexes are established according to the MVs. In an embodiment, a stream parser is adopted for parsing the bit streams of all compressed video files and obtaining the MVs thereof. A MV statistical method is disclosed in the embodiment regarding MVs having different resolutions. For example, which MVs are used for establishing the search indexes is determined according to whether the block sizes of macro blocks (MB) corresponding to the MVs in all the frames of each group of pictures (GOP) exceed a threshold.

Since different video files corresponding to the same movie have the same plot even when they have different titles, formats, image sizes, or qualities, the MVs of these video files have the same or similar distributions (as shown in FIG. 7A or FIG. 7B). Namely, the frames do not change much in the time domain. Thus, MVs can be selectively obtained from the corresponding frames according to a specific proportion (for example, 1:2, 1:4, or 1:N, wherein N is an integer) as long as certain precision is achieved in the constructed 3D MV map.

Thereafter, in an exemplary embodiment of the disclosure, related video files are located according to the 3D MV map, and the search result is displayed according to the relevancies of these video files. In an embodiment, the MVs of all micro blocks (MBs) in the 3D MV map corresponding to the selected video file (the search target) are compared with the MVs of the corresponding MBs in the 3D MV maps of the video files to be searched. The correlations of these video files are obtained according to the comparison result, and the search result is displayed according to the relevancies.

Figure 3:
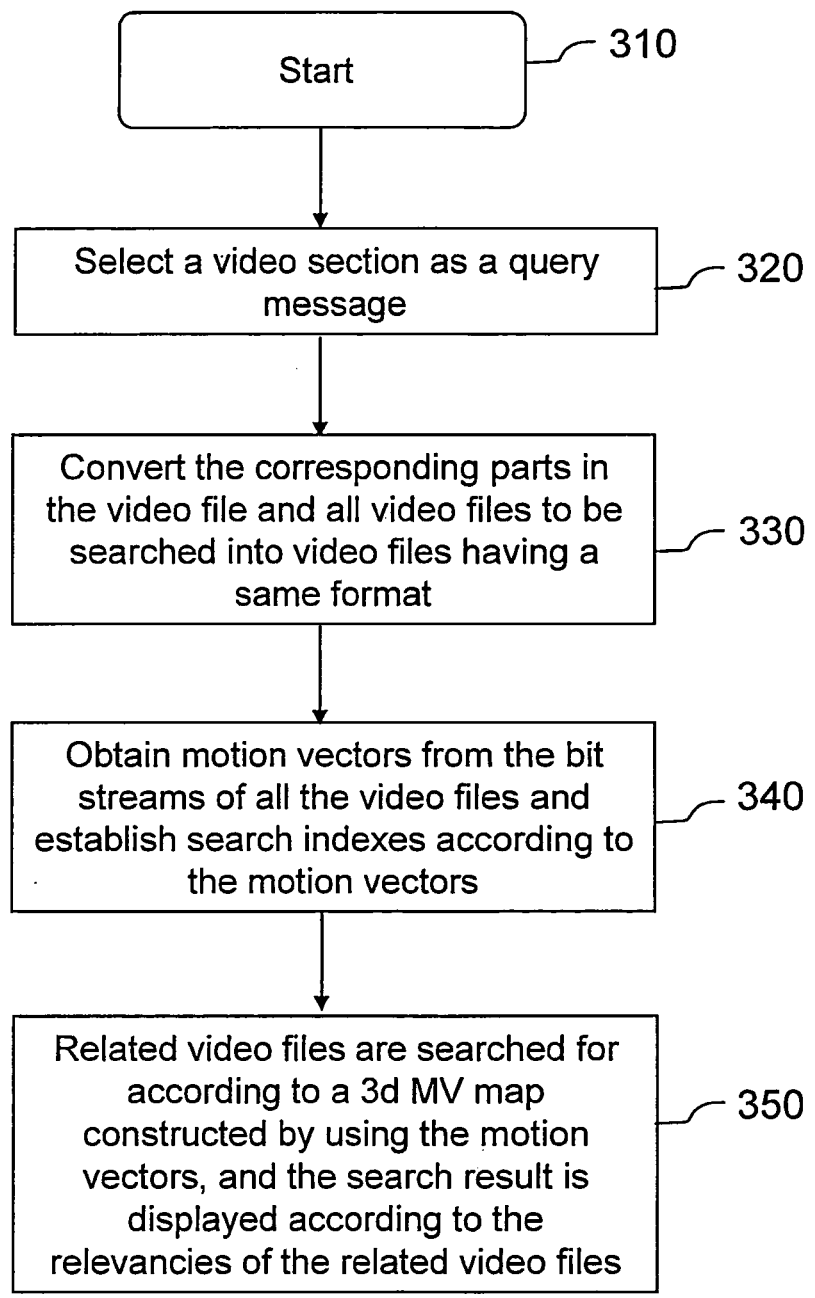
FIG. 3 is a flowchart of a video search method according to an exemplary embodiment.

The disclosure provides a new video search method. FIG. 3 is a flowchart of a video search method according to an exemplary embodiment.

First, in step 310, the operation is started to search for videos according to a video content. In step 320, one video file is selected as a query message. The query message may be a video file of a time length selected by a user in a video playing software (capture a section of a played movie as the query message by using a remote control or through other technique), or the query message may also be a video file within a fixed or specific time duration automatically captured through a user interface after the user clicks one function key on the user interface. Any technique that can capture a video file with a time duration can be applied in the exemplary embodiment.

After a video file is selected as a search condition, in step 330, because the video files may have different titles, formats, sizes, or even qualities, the video file served as the search condition and all video file to be searched are selectively converted into video files having a same format. However, this step is skipped if all the video files have the same format. Because the concept of time domain is brought into the embodiment, video files corresponding to the same time section in the time domain are located in all the video files to be searched. After that, these video files are converted into video files having the same format. In an embodiment, all the video files to be searched may be stored in an Intranet host, a host database of a search engine, or a cloud database. The format conversion operation may be carried out in a personal host, a system server of an Intranet, the host of a search engine, or a cloud operating system.

In step 340, the bit streams of all the video files (which are usually compressed data) are parsed, and MVs in corresponding frames are selectively obtained according to a specific proportion (for example, 1:2, 1:4, or 1:N, wherein N is the number of the frames), so as to adjust the sampling rate of the time domain flexibly. In the embodiment, converting all the video files (including the video file served as the search condition) into video files having the same format is to obtain the MVs in all the video files. Namely, the MVs are obtained from all the compressed video files to establish the search indexes.

In the embodiment, the MVs having different resolutions can be changed through up-sampling or down-sampling. For example, a video file is usually composed of a plurality of frames that are continuously arranged in the time domain, and each frame is composed of a plurality of MBs. Each MB may be a 16×16 unit and may have one or 16 (one MB is further divided into 16 4*4 units) MVs. Accordingly, a single MB may have 1 to 16 MVs in movies of different formats, which brings inconvenience to the subsequent MV distance calculation. Thus, in order to achieve the same resolution, the numbers of MVs in all the MBs have to be adjusted into a same number. In an embodiment, an average technique may be adopted to convert n MVs into one MV, wherein an average value of the n MVs is calculated.

Additionally, if one MV is to be converted into n MVs, the single MV is converted into n MVs having the same value.

Moreover, how the number of MVs in a MB is selected can be determined through a statistical mechanism. For example, a group of pictures (GOP) is usually defined based on the MPEG video coding format. When continuous dynamic images are processed according to the MPEG-4 protocol, to achieve a better compression effect, the GOP is defined to obtain random access operations in the image data. For example, according to the MPEG-4 protocol, the GOP contains nine images (one image I, two forwardly predicted images P, and six backwardly predicted images B). Thus, in an example, in order to determine the most suitable number of MVs, the number of MVs used for establishing the search indexes is determined according to whether the block sizes of macro blocks (MB) corresponding to the MVs in each GOP exceed a threshold.

Next, in step 350, the correlations are calculated according to the 3D MV map constructed based on the MVs, and related video files are obtained according to the correlations and displayed according to their relevancies.

After selecting the video file as the search condition, since different video files having different titles, formats, sizes, or even qualities may have the same plot if they belong to the same movie, the MVs of these video files may have the same or similar distributions, as shown in FIG. 7A or 7B. Thus, movies having the same or similar plots can be found by establishing a search index with respect to the selected video file. In an exemplary embodiment, the obtained MVs are brought into a matrix, so as to obtain a 2D MV map. Different 2D MV maps are generated according to continuously displayed frames based on the time duration (for example, 30 seconds or one minute) of the selected video file. Since the video file is selected in the time domain, a 3D MV map is constructed. However, since there are many frames within a time duration (for example, 30 frames per second or 1800 frames per minute), a great deal of calculations have to be performed to bring in all the corresponding MVs, and accordingly the processing time may be prolonged.

Since different video files having different titles, formats, sizes, or even qualities may have the same plot if they belong to the same movie, the MVs of these video files may have the same or similar distributions, as shown in FIG. 7A or 7B. Namely, the images do not change much in the time domain. Thus, the MVs of the corresponding frames can be selectively obtained according to a specific proportion (for example, 1:2, 1:4, and 1:N, wherein N is an integer) as long as the 3D MV map constructed can reach a certain precision.

Thereafter, in an exemplary embodiment of the disclosure, the related video files are obtained according to the 3D MV map, and the search result is displayed according to their relevancies. In an embodiment, a distance calculation is performed on the MVs of all the MBs in the 3D MV map of the selected video file (i.e., the search target) and the MVs of the MBs in the corresponding 3D MV maps of all the video files to be searched. After that, the distances are compared to obtain the correlations of the video files, and the video files are displayed according to the correlations. For example, in an embodiment, a root-mean-square (RMS) calculation or an absolution distance calculation is performed on the MVs in the $N^{th}$ frames of two video files to obtain a distance. The distribution of the distances is served as the correlations and the search result is displayed.

Figure 4:
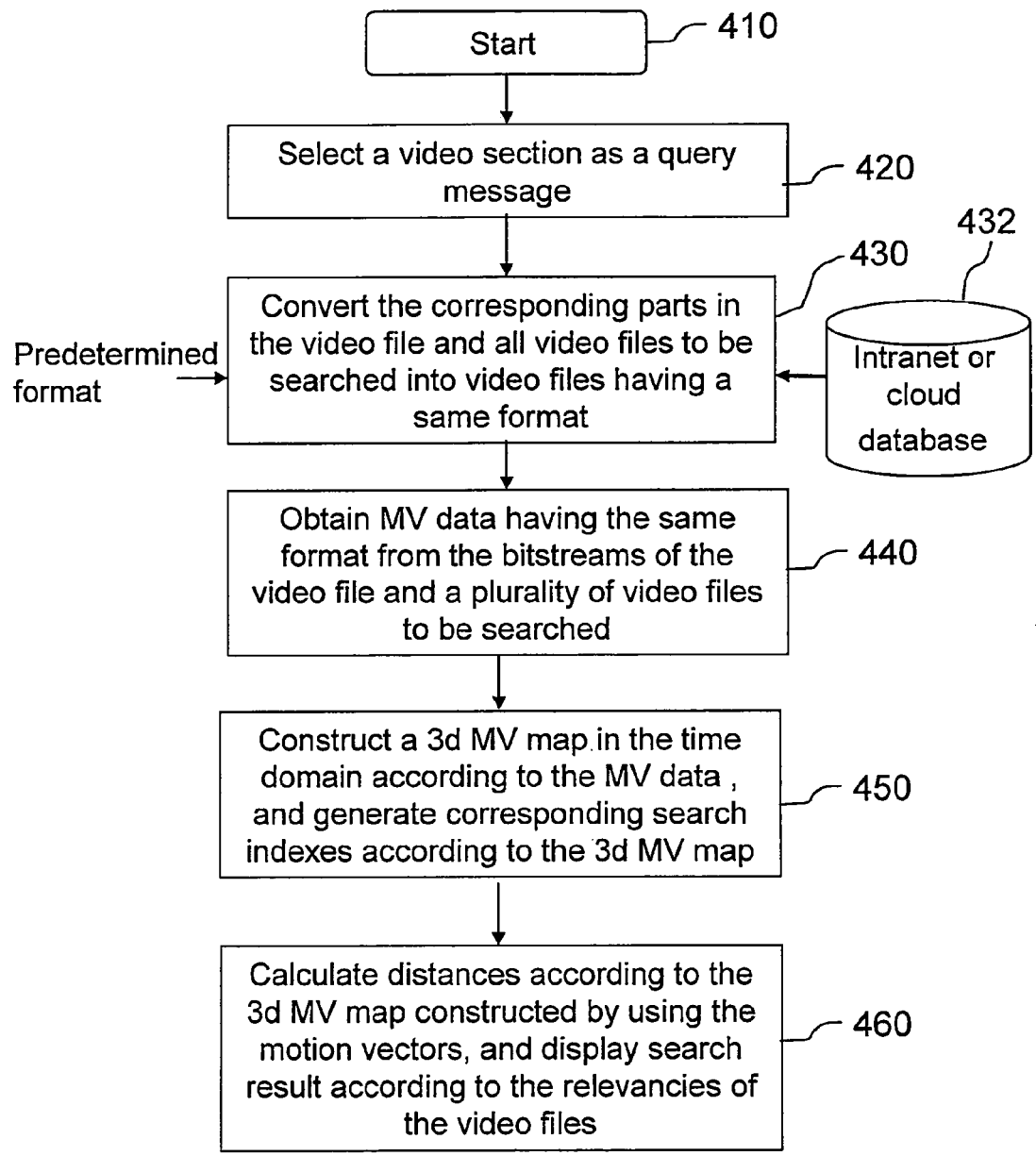
FIG. 4 is a flowchart of a video search method according to another exemplary embodiment.

FIG. 4 is a flowchart of a video search method according to another exemplary embodiment of the disclosure, wherein the technique of constructing a search condition based on a video content so as to search for video files is described in detail.

First, in step 410, the operation of searching for video files based on a video content is started. In step 420, one video file is selected as a query message. The query message may be a video file of a time length selected by a user in a video playing software (capture a section of a played movie as the query message by using a remote control or through other technique), or the query message may also be a video file within a fixed or specific time duration automatically captured through a user interface after the user clicks one function key on the user interface. Any technique that can capture a video file with a time duration can be applied in the exemplary embodiment.

After a video file is selected as a search condition, in step 430, because the video files may have different titles, formats, sizes, or even qualities, the video file served as the search condition and all video file to be searched are selectively converted into video files having a same format. However, this step is skipped if all the video files have the same format.

Because the concept of time domain is brought into the embodiment, video files corresponding to the same time section in the time domain are located in all the video files to be searched. After that, these video files are converted into video files having the same format. The same format may be a predetermined format (for example, a format generally adopted in the technique or a format predetermined by the industry), and which is determined by taking the optimization of the search efficiency and search result into consideration.

In the embodiment, all the video files to be searched may be stored in a database 432, such as an Intranet host, a host database of a search engine, or a cloud database. The format conversion operation may be carried out in a personal host, a system server of an Intranet, the host of a search engine, or a cloud operating system.

In step 440, the bit streams of all or part of the video files (which are usually compressed data) are parsed, and MVs in corresponding frames are selectively obtained according to a specific proportion (for example, 1:2, 1:4, or 1:N, wherein N is the number of the frames), so as to adjust the sampling rate of the time domain flexibly. In the embodiment, converting all the video files (including the video file served as the search condition) into video files having the same format is to obtain the MVs in all the video files. Namely, the MVs are obtained from all the compressed video files to establish the search indexes.

In the embodiment, the resolution corresponding to different search condition (i.e., MVs having different resolution) can be changed through up-sampling or down-sampling. For example, a video file usually includes a plurality of continuous frames, and each frame includes a plurality of MBs. Each MB may be a 16×16 unit and may have one or 16 MVs (different format is corresponding to different number of MVs). To achieve the same resolution, the numbers of MVs in all the MBs have to be adjusted into a same number. In an embodiment, an average technique may be adopted to convert n MVs into one MV, wherein an average value of the n MVs is calculated, as expressed below:

$$MV = \frac{MV_1 + MV_2 + MV_3 + MV_4 + \ldots + MV_n}{n}$$

In addition, if one MV is to be converted into n MVs, the single MV is converted into n MVs having the same value, as expressed below:

$$MV=MV_1=MV_2=MV_3=MV_4=\ldots=MV_n$$

Moreover, the number of MVs in a MB can be determined through a statistical mechanism. For example, a GOP is usually defined based on the MPEG video coding format. When continuous dynamic images are processed according to the MPEG-4 protocol, to achieve a better compression effect, the GOP is defined to obtain random access operations in the image data. For example, according to the MPEG-4 protocol, the GOP contains nine images (one image I, two forwardly predicted images P, and six backwardly predicted images B). Thus, in an example, in order to determine the most suitable MV number, the number of MVs used for establishing the search indexes is determined according to whether the block sizes of macro blocks (MB) corresponding to the MVs in each GOP and the ratios thereof exceed a threshold.

For example, a GOP has following block sizes and the corresponding ratios:
BS=16×16 50%
BS=16×8 15%
BS=8×8 25%
BS=8×4 3%
BS=4×4 7%

In this example, the threshold is set to 50%. Thus, the block size 16×16 takes up 50%, which satisfies the selection condition. Thus, the block size BS=16×16 is selected as the MV map resolution. Namely, regardless of the original numbers of MVs in the MBs, they are all adjusted into a same number based on $MV=MV_1=MV=MV=MV_4=\ldots=MV_n$. However, if none of the block sizes has a ratio over the threshold, a fixed block size is then changed (for example, the MVs in BS=16×16) and served as the resolution for generating the MV maps. Namely, if there are nine MVs in a MB, the number of MVs in the search condition is also adjusted to nine, and the block size is also adjusted correspondingly.

Next, in step 450, a 3D MV map is constructed in the time domain according to the MVs, and the correlations are calculated. Related video files are searched and displayed according to the relevancies.

After selecting a video file as the search condition, since different video files having different titles, formats, sizes, or even qualities may have the same plot if they belong to the same movie, the MVs of these video files may have the same or similar distributions, as shown in FIG. 7A or 7B. Thus, movies having the same or similar plots can be found by establishing a search index with respect to the selected video file. In an exemplary embodiment, the obtained MVs are brought into a matrix to obtain a 2D MV map.

For example:

| (2, 3) | (2, 5, 2) | (2, 4) | ... | Frame 1 |
| (4, 3) | (4, 1) | (7, 4) | ... | Frame 2 |
| (6, 4) | (5, 2) | (5, 5) | ... | Frame 3 |

Different 2D MV maps corresponding to continuously displayed frames are generated according to the time duration of the selected video file (for example, 30 seconds or one minute). Since the video file is selected in the time domain, a 3D MV map is constructed. However, since there are many frames within a time duration (for example, 30 frames per second or 1800 frames per minute), a great deal of calculations have to be performed to bring in all the corresponding MVs, and accordingly the processing time may be prolonged.

Since different video files having different titles, formats, sizes, or even qualities may have the same plot if they belong to the same movie, the MVs of these video files may have the same or similar distributions, as shown in FIG. 7A or 7B. Namely, the images do not change much in the time domain. Thus, the MVs of the corresponding frames can be selectively obtained according to a specific proportion (for example, 1:2, 1:4, and 1:N, wherein N is an integer) as long as the 3D MV map constructed can reach a certain precision.

Thereafter, in an exemplary embodiment of the disclosure, in step 460, related video files are searched for according to the 3D MV map, and the search result is displayed according to the relevancies of the video files. In an embodiment, a distance calculation is performed on the MVs of all the MBs in the 3D MV map of the selected video file (i.e., the search target) and the MVs of the MBs in the corresponding 3D MV maps of all the video files to be searched. The distance distributions are then compared, and the correlations are obtained according to the comparison result so as to display the search result accordingly. For example, in an embodiment, a RMS calculation or an absolution distance calculation is performed on the MVs in the $N^{th}$ frame and the $(N-1)^{th}$ frames of two video files to obtain a distance. The distribution of the distances is served as the correlations and the search result is displayed.

For example, the distance is the following value:

$$D=\sqrt{[\text{frame}(n)\text{MV}-\text{frame}(n-1)\text{MV}]^2}$$

In foregoing expression, the RMS calculation is adopted. Or:

$$D=|\text{frame}(n)\text{MV}-\text{frame}(n-1)\text{MV}|$$

The correlations with the search target are obtained according to the distance distributions of different MVs, and the search result is obtained by sorting the correlations. Besides, the first ten or twenty most relevant video files may be obtained and displayed.

The video search method in the embodiment may be implemented as a software. In another embodiment, the video search method may also be implemented as a firmware. Or, the video search method in the embodiment may also be implemented with both hardware and software. Additionally, part of the video search method in the embodiment may also be deployed in a personal host or an Intranet, while the other part of the video search method may be deployed in a remote system, such as a host of a search engine or a cloud operating system.

Figure 1B:
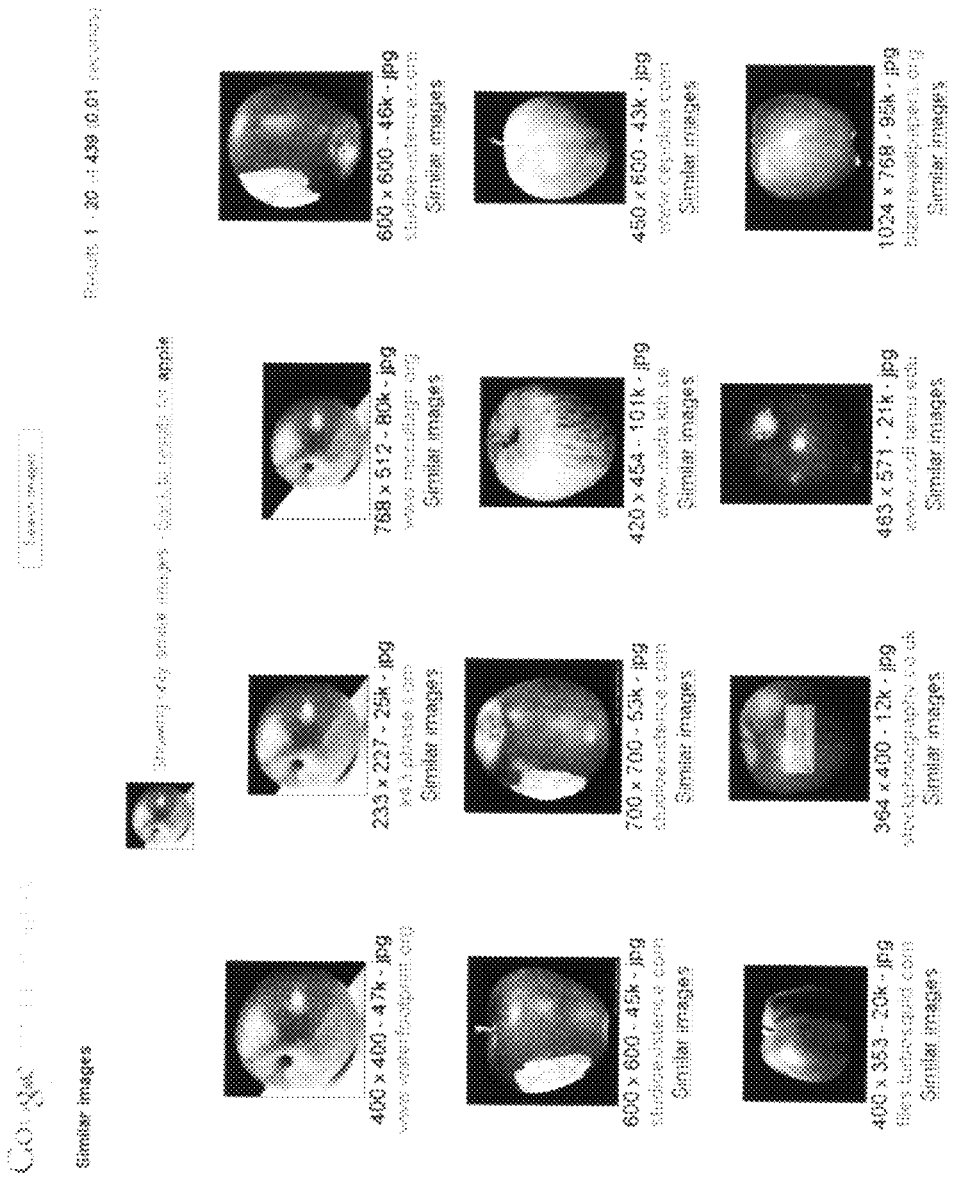
Figure 1C:
Figure 2:
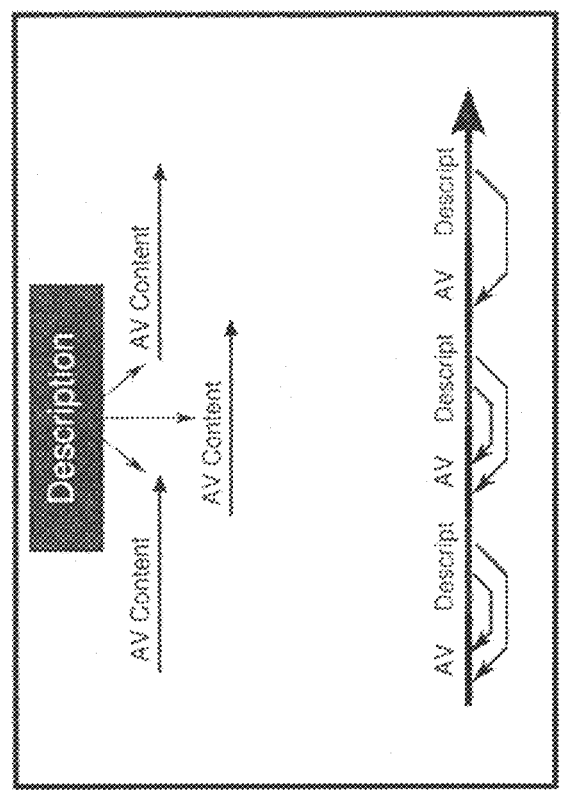
FIG. 2 is a diagram illustrating the correlation between an audio-visual (AV) content and a content description specified in the MPEG-7 standard.

In the video search method provided by the embodiment, the technique illustrated in FIGS. 1A-1C may be adopted, wherein a coarse selection is first performed to find a plurality of related video files for the user, and then a fine selection is performed (by further providing a comparison condition) to more relevant videos. This is another application of the embodiment.

Figure 5A:
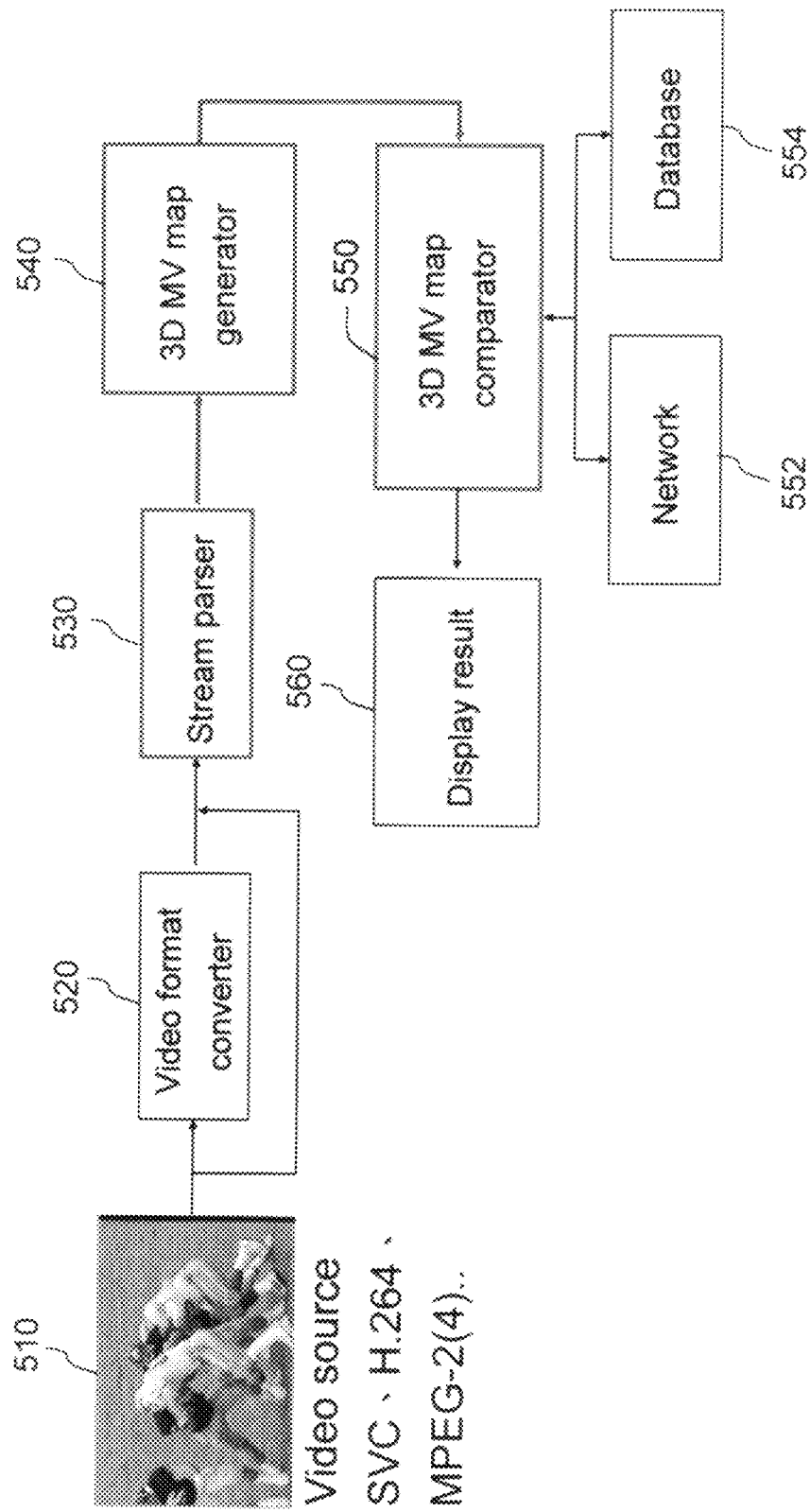
FIG. 5A is a block diagram of a video search apparatus according to an exemplary embodiment.

FIG. 5A is a block diagram of a video search apparatus according to an embodiment of the disclosure. However, this embodiment is not intended to limit the scope of the disclosure.

This video search apparatus includes a stream parser 530, a 3D MV map generator 540, and a 3D MV map comparator 550.

In the stream parser 530, the bit streams of a plurality of compressed video files are parsed to obtain MVs.

The stream parser 530 can change the resolution corresponding to different search condition (i.e., MVs having different resolution) through up-sampling or down-sampling. Additionally, in order to convert the resolutions of the search indexes into the same resolution, the stream parser 530 adjusts the numbers of MVs in all the MBs into a same number. For example, to adjust n MVs into a single MV, an average technique may be adopted to calculate an average value of the n MVs, and to convert a single MV into n MVs, the single MV may be converted into n MVs having the same value.

Moreover, the stream parser 530 determines the number of MVs in a MB through a statistical mechanism. For example, the stream parser 530 determines the number of MVs for establishing the search indexes by determining whether the ratios of the block sizes corresponding to the MVs in the MBs of each GOP exceed a threshold.

The 3D MV map generator 540 constructs a 3D MV map in the time domain according to the MVs. The 3D MV map generator 540 brings the MVs into a matrix to obtain a 2D MV map. Different 2D MV maps are generated according to the time duration of the selected video file and continuously displayed frames, and a 3D MV map is then constructed by bringing the parameter of time domain.

Since there are many frames within a time duration, the 3D MV map generator 540 obtains the MVs in the corresponding frames according to a specific proportion (for example, 1:2, 1:4, and 1:N, wherein N is an integer) such that the constructed 3D MV map can reach a predetermined precision. In an embodiment, the related video files may also be searched through a coarse selection and a fine selection.

The 3D MV map comparator 550 searches for the related video files according to the 3D MV map and displays the search result according to their relevancies. The 3D MV map comparator 550 connects to a network 552 or a database 554 to read the 3D MV map. The 3D MV map comparator 550 performs a RMS calculation or an absolution distance calculation on the MVs in the $N^{th}$ frame and the $(N-1)^{th}$ frames of two video files to obtain a distance, serves the distance distributions as the correlations, and displays the search result on a display 560.

The video search apparatus disclosed in the embodiment further includes a video format converter 520. The video format converter 520 first obtains the video files corresponding to the same time section in the video file 510 served as the search condition and all the video files to be searched. Then, the video format converter 520 selectively converts these video files into video files having the same format. However, this operation is skipped if the video files have the same format, and in this case, the video file 510 is directly sent to the stream parser 530.

In an exemplary embodiment, the video file 510 is obtained by selecting one section from a currently played video file as a query message. The query message may be a video file of any time length selected by a user or a video file within a fixed or a specific time duration automatically selected through a user interface.

A video playing apparatus having a host and a controller is provided in an embodiment. The host has a video search apparatus as illustrated in FIG. 5A. The controller has a function control apparatus. The function control apparatus allows a user to select one section from the video data currently played by the host as a query video file of the video search apparatus. In an embodiment, the host is a television set, and the controller is a wireless remote controller for controlling the television set in a wireless manner. In another embodiment, the host is a computer host, and the controller is a wired or wireless mouse.

Figure 5B:
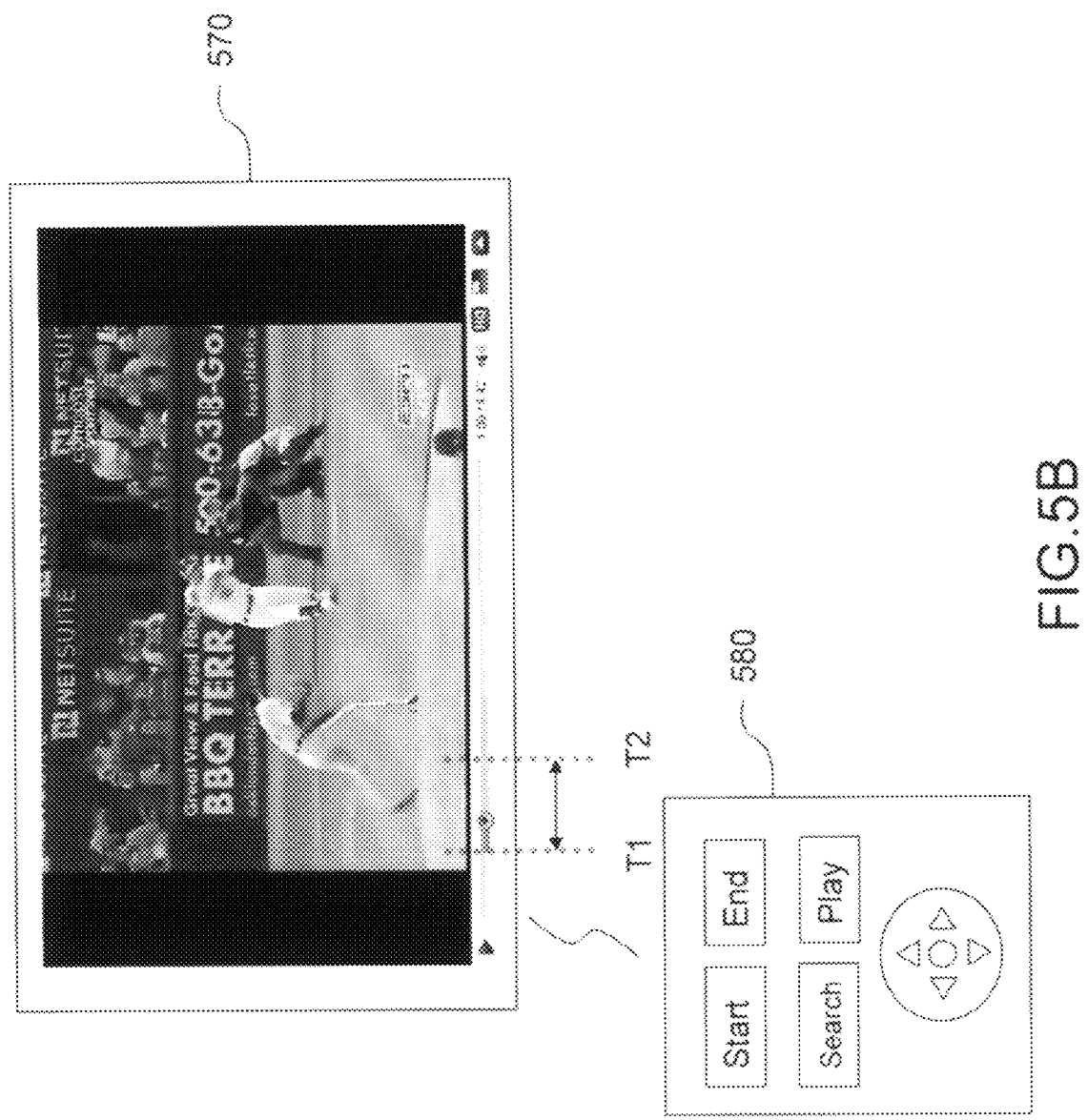
FIG. 5B is a diagram illustrating a method of selecting a query movie section according to an exemplary embodiment.

Referring to FIG. 5B, the function of selecting a movie section is built in a remote controller 580 for controlling the playing of the movie. When the movie is played in the television set 570, the user selects the section from a first time T1 to a second time T2 as a query message. In another exemplary embodiment, the user may also capture a section of the movie within a time duration as the query message through a user interface of a personal computer (for example, the mouse or the user interface on a touch screen).

Figure 6B:
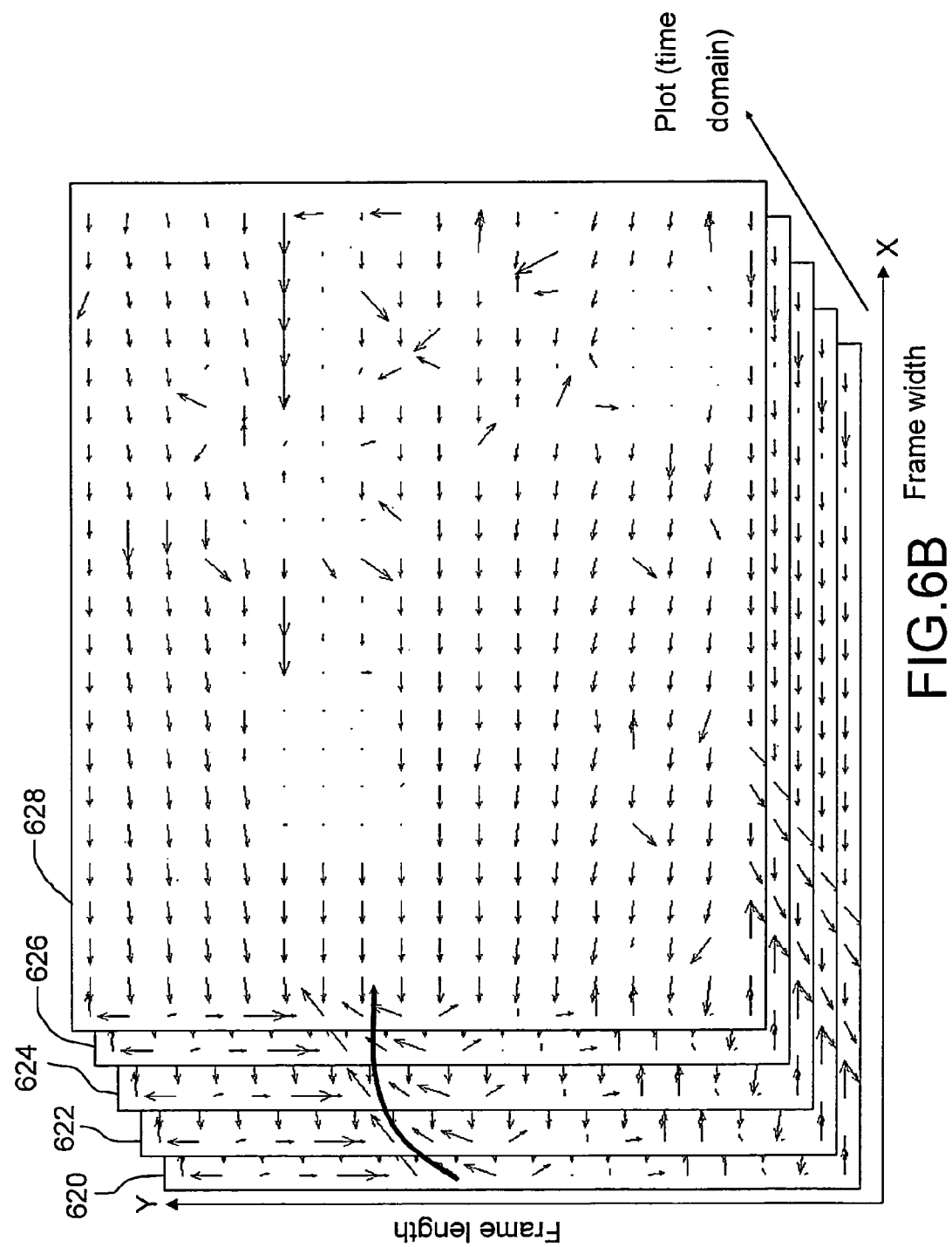
FIG. 6B is a diagram illustrating a plurality of continuous frames of a video file in a time domain and MVs of these frames.

FIG. 6A illustrates the MVs in a frame 610, and FIG. 6B illustrates a plurality of continuous frames of a video file in the time domain and the MVs in the frames. The frames 620, 622, 624, 626, and 628 can be defined as the GOP in the embodiment.

Figure 6C:
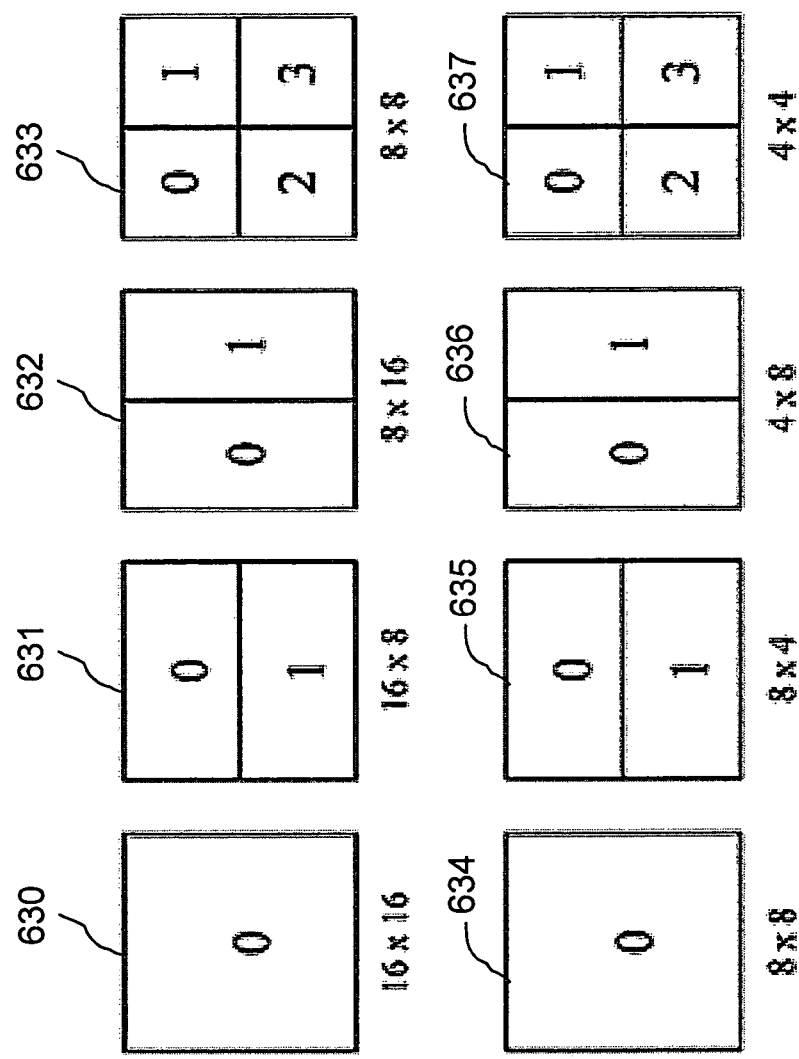
FIG. 6C is a diagram illustrating different block sizes corresponding to MVs in a microblock (MB).

FIG. 6C illustrates different block sizes corresponding to the MVs in different MBs. For example, the MB 630 has a block size 16×16 and one MV. The MB 631 has a block size 16×8 and two MVs. The MB 632 has a block size 8×16 in another direction. The MB 633 has a block size 8×8 and four MVs. The MB 634 has a block size 8×8 and one MV. The MBs 635 and 636 respectively have a block size 8×4 and a block size 4×8 in different directions and respectively have two MVs. The MB 637 has a block size 4×4 and one MV.

FIG. 7A and FIG. 7B are diagrams respectively illustrating movie sections belonging to the same movie ("Top Gun") but having different resolutions (for example, a high definition (HD) movie section 710 and a common image format (CIF) movie section 730 (corresponding to the same time section of 4 minutes and 18 seconds)). There are respectively the frames 720, 722, 724, 726, and 728 and the frames 740, 742, 744, 746, and 748 according to the plot of the movie (i.e., the variation of the time domain). However, different video files corresponding to the same movie have the same plot even if they have different titles, formats, image sizes, or qualities. Namely, the images do not change much in the time domain.

Figure 8A:
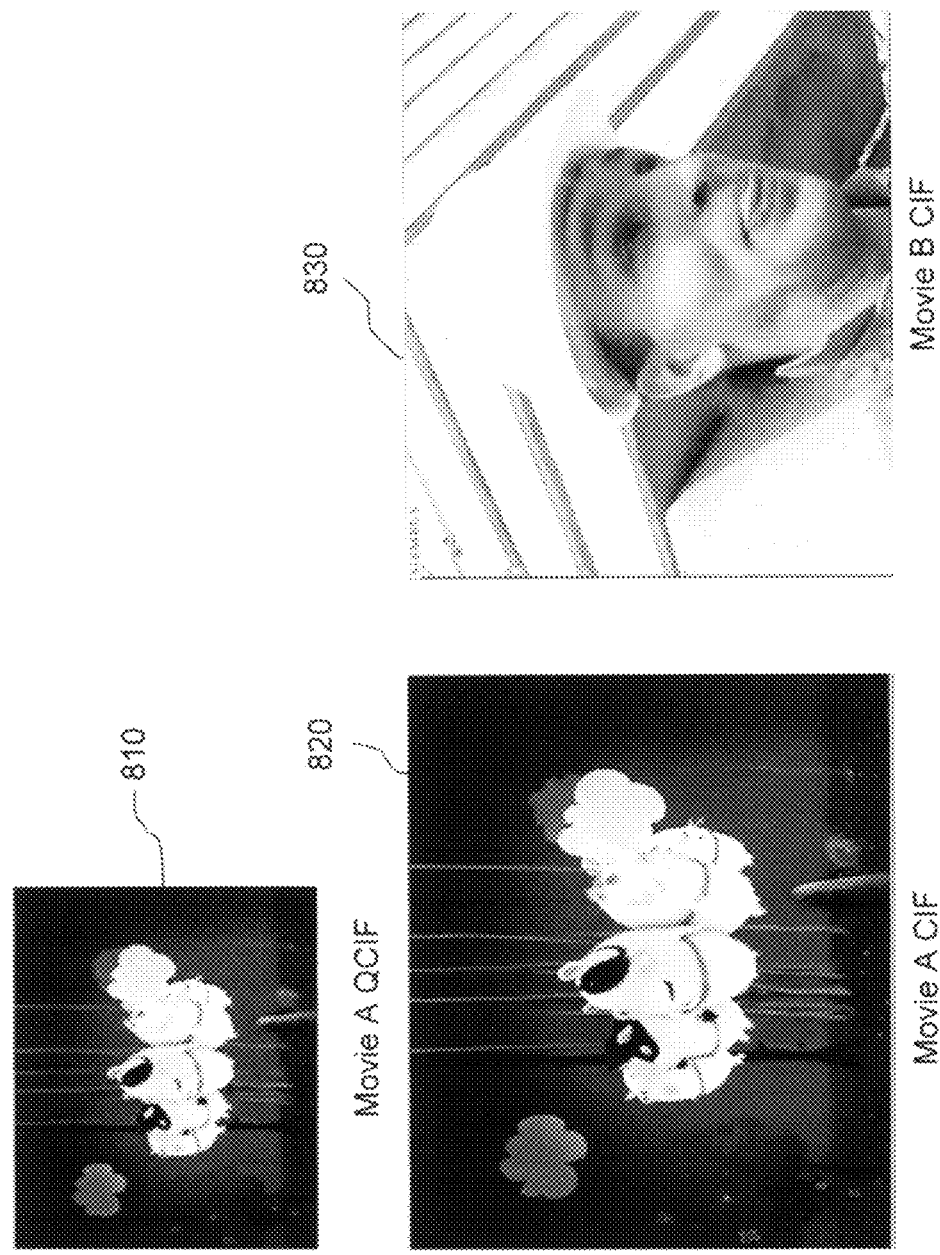
FIG. 8A is a diagram illustrating how a movie A in a quarter common image format (QCIF) format, a movie A in a common image format (CIF) format, and a movie B in a CIF format are searched.
Figure 8B:
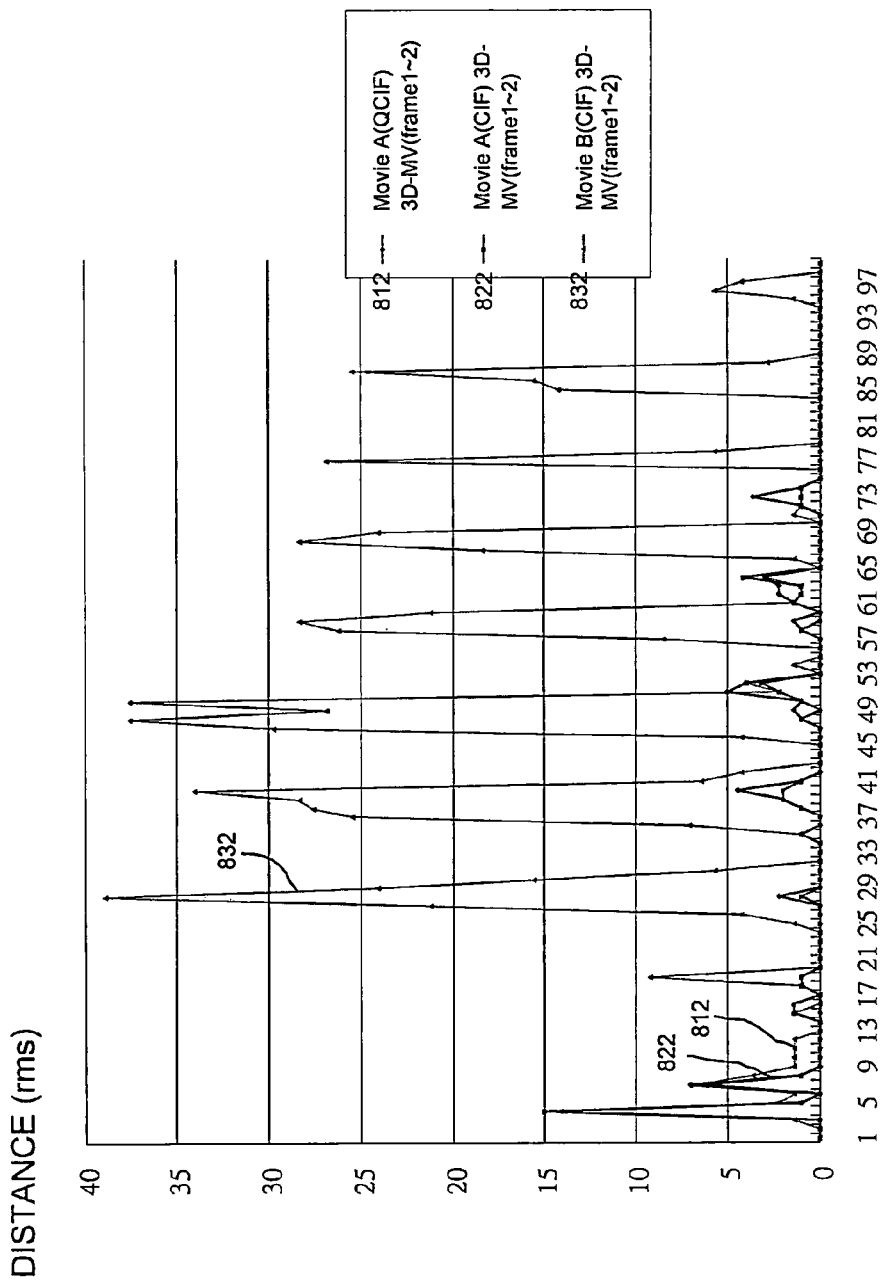
FIG. 8B is a diagram illustrating the distances of the three movies in FIG. 8A obtained through the video search method according to the embodiment.

FIG. 8A is a diagram illustrating a movie A 810 in a quarter common image format (QCIF) format, a movie A 820 in a CIF format, and a movie B 830 in a CIF format according to an actual embodiment. The CIF format usually comes in 352× 288 pixels, and the QCIF format usually comes in 176×144 pixels. The distance obtained through the video search method in the embodiment is as shown in FIG. 8B, wherein the symbol 812 indicates the distance of the movie A in the QCIF format, the symbol 822 indicates the distance of the movie A in the CIF format, and the symbol 832 indicates the distance of the movie B in the CIF format. It can be understood by referring to FIG. 8B that the distance distribution of the movie A in the QCIF format is very similar to that of the movie A in the CIF format, while the distance distributions of the movie A in the QCIF format and the movie A in the CIF format are very different from that of the movie B in the CIF format. Thereby, the correlations thereof can be obtained.

Figure 8C:
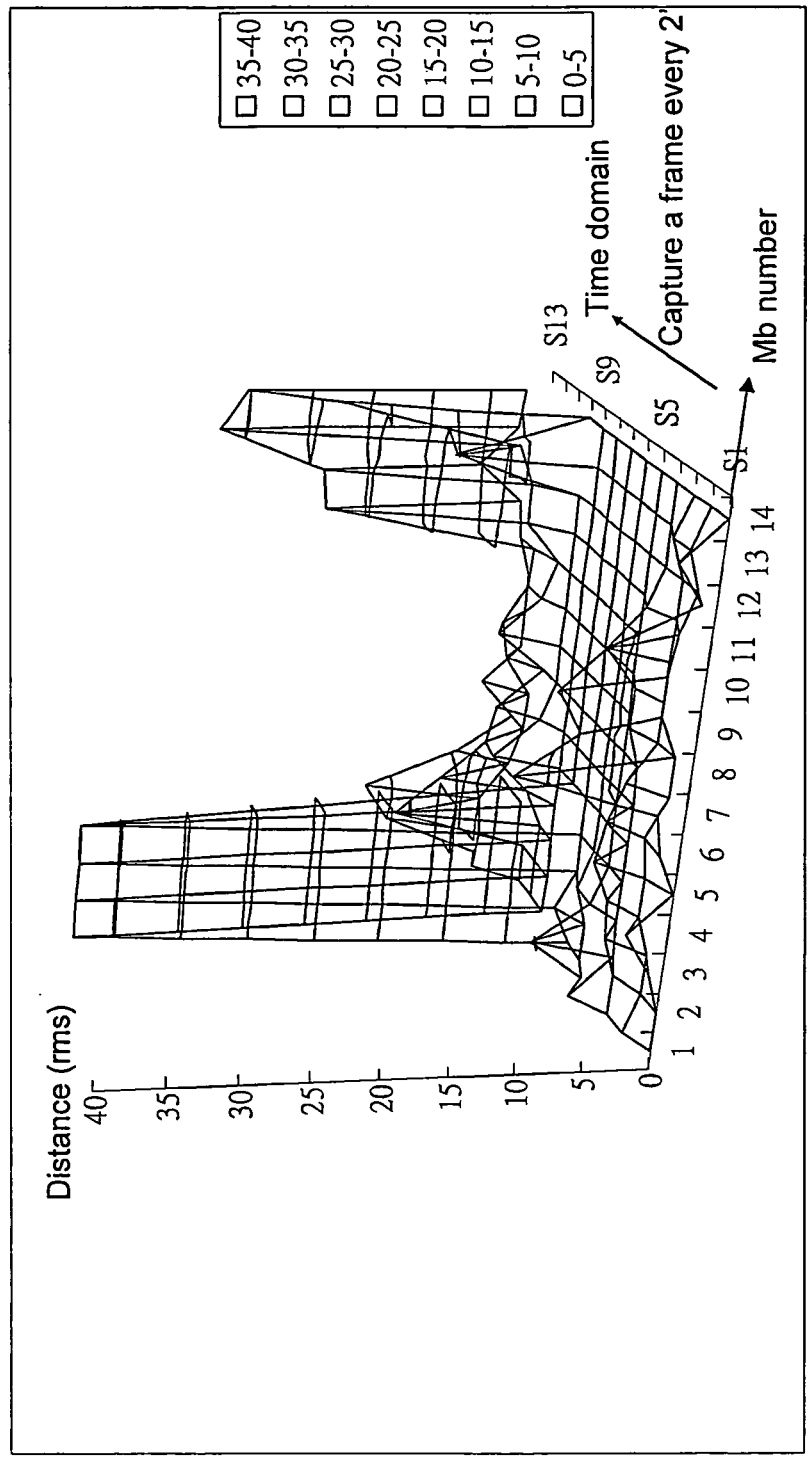
FIGS. 8C, 8D, and 8E are diagrams respectively illustrating the distributions of 3D MV maps of the movie A in the QCIF format, the movie A in the CIF format, and the movie B in the CIF format in FIG. 8A.
Figure 8D:
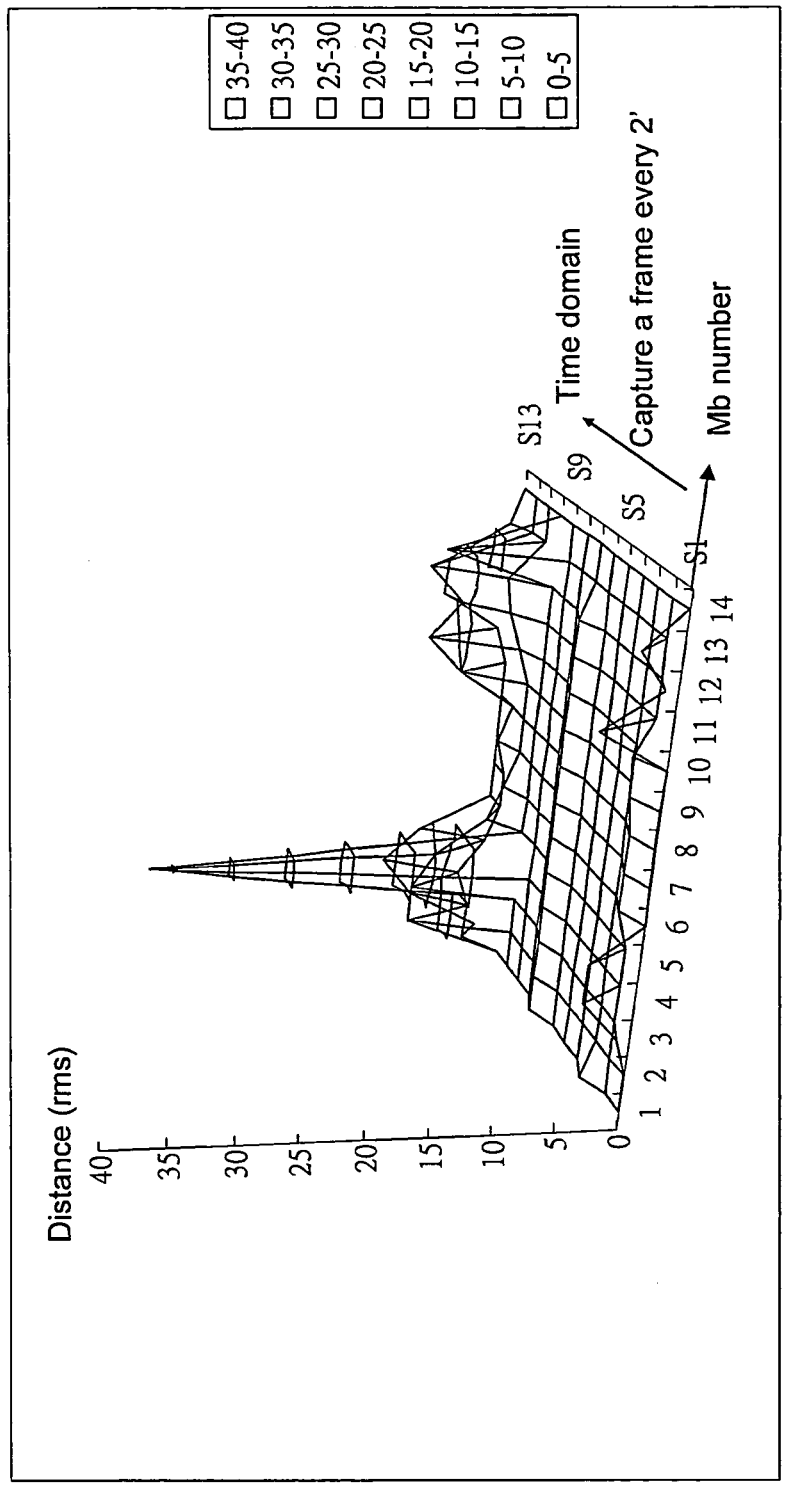
Figure 8E:
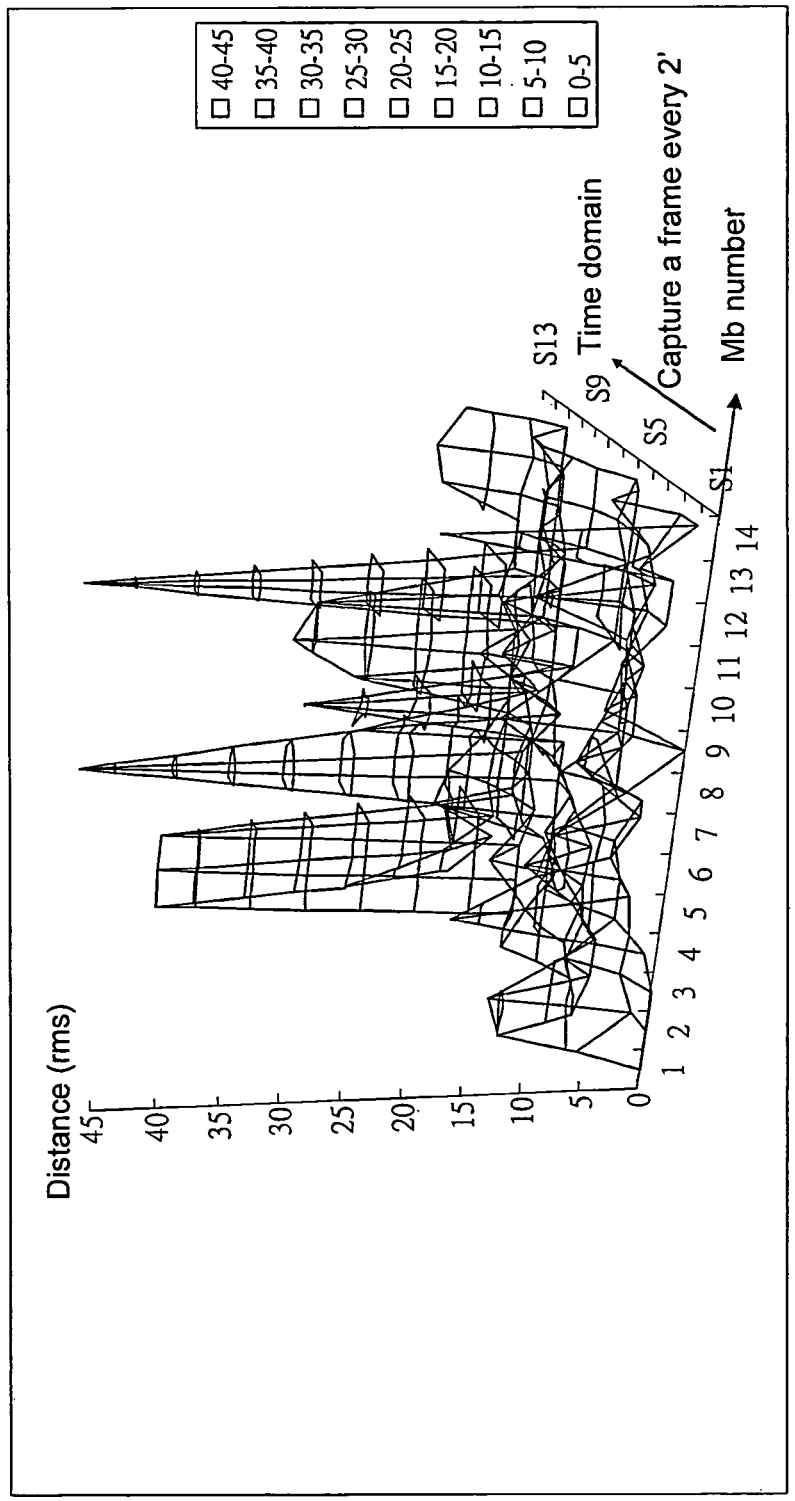

FIGS. 8C, 8D, and 8E are diagrams respectively illustrating the 3D MV maps of the movie A in the QCIF format, the movie A in the CIF format, and the movie B in the CIF format when every $9^{th}$ frame is captured. As shown in FIGS. 8C, 8D, and 8E, the 3D MV map distribution of the movie A in the QCIF format is very similar to that of the movie A in the CIF format, but the 3D MV map distributions of the movie A in the QCIF format and the movie A in the CIF format are very different from that of the movie B in the CIF format.

As described above, the embodiment provides a new video search method, wherein the correlations with the search target are obtained according to the distance distribution, and the search result can be sorted and displayed according to the correlations.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A video search method, applied to a video search apparatus to obtain a video search result among a plurality of video files to be searched, the method comprising:
    selecting a video file having a time length as a query video file, and parsing bit streams of the query video file and the plurality of video files to be searched to obtain a plurality of corresponding motion vectors (MVs) by the video search apparatus;
    sequentially constructing a plurality of corresponding MV maps in a time domain according to the MVs by the video search apparatus, wherein each of the MV maps consists of a first number of the MVs;
    obtaining correlations between the MV map of the query video file and the MV map of each of the video files to be searched by comparing the MVs in the MV map of the query video file with the MVs in the MV map of the video file to be searched by the video search apparatus;
    obtaining the video search result according to the correlations by the video search apparatus; and
    before the step of obtaining the MVs from the query video file and the video files to be searched, selectively converting the query video file and the video files to be searched into video files having a same format through a conversion operation.

2. The video search method according to claim 1, wherein the query video file is selected by a user.

3. The video search method according to claim 1, wherein the query video file is selected through a user interface.

4. The video search method according to claim 1, wherein the query video file is synchronous to the video files to be searched in the time domain.

5. The video search method according to claim 1, wherein the same format indicates that the query video file and the video files to be searched respectively have a same number of MVs.

6. The video search method according to claim 1, wherein the conversion operation is to change a plurality of frames of the query video file and the video files to be searched that have different numbers of MVs into frames having a same number of MVs through up-sampling or down-sampling.

7. The video search method according to claim 6, wherein the conversion operation changes the frames have different numbers of MVs into the frames having the same number of MVs by obtaining the numbers of the MVs in the frames in each group of pictures (GOP) and adjusting the numbers according to a threshold.

8. The video search method according to claim 1, wherein the video files to be searched are stored in an Intranet host, a host database of a search engine, or a cloud database.

9. The video search method according to claim 1, wherein in the step of constructing the corresponding MV maps in the time domain according to the MVs, the frames in the query video file and the video files to be searched are selected in the time domain according to a specific proportion, and the MV maps are constructed according to the MVs in the selected frames.

10. The video search method according to claim 9, wherein the specific proportion indicates that every $(N+1)^{th}$ frame in the query video file and the video files to be searched is selected in the time domain, wherein N is an integer greater than or equal to 1.

11. The video search method according to claim 10, wherein in the step of constructing the MV maps, the selected frames are filled into a matrix to obtain a 2-dimensional (2D) MV map, and a 3D MV map is constructed because the frames are selected in the time domain.

12. The video search method according to claim 1, wherein in the step of obtaining the correlations between the MV map of the query video file and the MV map of each of the video files to be searched, a distance of the MVs in every adjacent two frames of the MV map corresponding to the query video file and a distance of the MVs in every adjacent two frames of the MV map corresponding to each of the video files are compared, and the correlations are obtained according to a comparison result.

13. The video search method according to claim 12, wherein the distance of the MVs in every two adjacent frames is obtained through a root mean square (RMS) calculation or an absolute distance calculation.

14. A video search apparatus, comprising:
    a stream parser, for parsing bit streams of a plurality of video files to be searched and bit streams of a query video file to obtain a plurality of motion vectors (MVs);
    a 3-dimensional motion vector (3D MV) map generator, for constructing 3D MV maps in a time domain according to the MVs, wherein each of the MV maps consists of a first number of the MVs;
    a 3D MV map comparator, for obtaining correlations between the MV map of the query video file and the MV map of each the video files to be searched by comparing the MVs included in the MV map of the query video file with the MVs in the MV map of the corresponding video file to be searched, and obtaining a video search result from the video files to be searched according to the correlations;
    at least one processor, for controlling the stream parser, the 3D MV map generator, and the 3D MV map comparator; and
    a video format converter, wherein the video format converter selectively converts the query video file and the plurality of video files to be searched into video files having a same format and outputs the video files to the stream parser.

15. The video search apparatus according to claim 14, wherein the query video file is a video file having a time length and is selected by a user.

16. The video search apparatus according to claim 14, wherein the query video file is a video file having a time length and is selected through a user interface.

17. The video search apparatus according to claim 14, wherein the query video file is synchronous to the video files to be searched in the time domain.

18. The video search apparatus according to claim 14, wherein the video files to be searched are stored in an Intranet host, a host database of a search engine, or a cloud database.

19. The video search apparatus according to claim 14, wherein the stream parser changes a plurality of frames of the query video file and the video files to be searched that have different numbers of MVs into frames having a same number of MVs through up-sampling or down-sampling.

20. The video search apparatus according to claim 19, wherein when the stream parser changes the frames have different numbers of MVs into the frames having the same number of MVs by obtaining the numbers of the MVs in the frames in each GOP and adjusting the numbers according to a threshold.

21. The video search apparatus according to claim 14, wherein the 3D MV map generator constructs the corresponding MV maps in the time domain according to the MVs by selecting the frames in the query video file and the video files to be searched in the time domain according to a specific proportion and constructing the MV maps according to the MVs in the selected frames.

22. The video search apparatus according to claim 21, wherein the specific proportion is to select every $(N+1)^{th}$ frame in the query video file and the video files to be searched in the time domain, wherein N is an integer greater than or equal to 1.

23. The video search apparatus according to claim 21, wherein the 3D MV map generator fills the selected frames into a matrix to obtain a 2D MV map, and a 3D MV map is constructed because the frames are selected in the time domain.

24. The video search apparatus according to claim 14, wherein the 3D MV map comparator compares distances of the MVs in every adjacent two frames of the MV map corresponding to the query video file according to the MV maps of the video files and obtains the correlations according to a comparison result.

25. The video search apparatus according to claim 24, wherein the distances of the MVs in every adjacent two frames are obtained through a RMS calculation or an absolute distance calculation.

26. A video playing apparatus, having a host and a controller, wherein the host has a video search apparatus in claim 14, the controller has a function control apparatus, the function control apparatus allows a user to select a section of a video data played by the host as the query video file of the video search apparatus.

27. The video playing apparatus according to claim 26, wherein the host is a television set, and the controller is a wireless remote control for wirelessly controlling the television set.

28. The video playing apparatus according to claim 26, wherein the host is a computer host, and the controller is a mouse.

29. A video search method, applied to a video search apparatus to obtain a video search result among a plurality of video files to be searched, the method comprising:

selecting a video file having a time length as a query video file, and parsing bit streams of the query video file and the plurality of video files to be searched to obtain a plurality of corresponding motion vectors (MVs) by the video search apparatus;

sequentially constructing a plurality of corresponding MV maps in a time domain according to the MVs by the video search apparatus, wherein every $(N+1)^{th}$ frame in the query video file and the video files to be searched is selected in the time domain, N is an integer greater than or equal to 1, the MV maps are constructed according to the MVs in the selected frames, each of the MV maps consists of a first number of the MVs, and the first number is determined by whether the ratios of a plurality of block sizes corresponding to the MVs in a group of pictures (GOP) exceeds a threshold;

obtaining a correlations between the MV map of the query video file and the MV map of each of the video files to be searched by comparing the MVs in the MV map of the query video file with the MVs in the MV map of the video file to be searched by the video search apparatus; and obtaining the video search result according to the correlations by the video search apparatus.

\* \* \* \* \*